Patented May 25, 1937

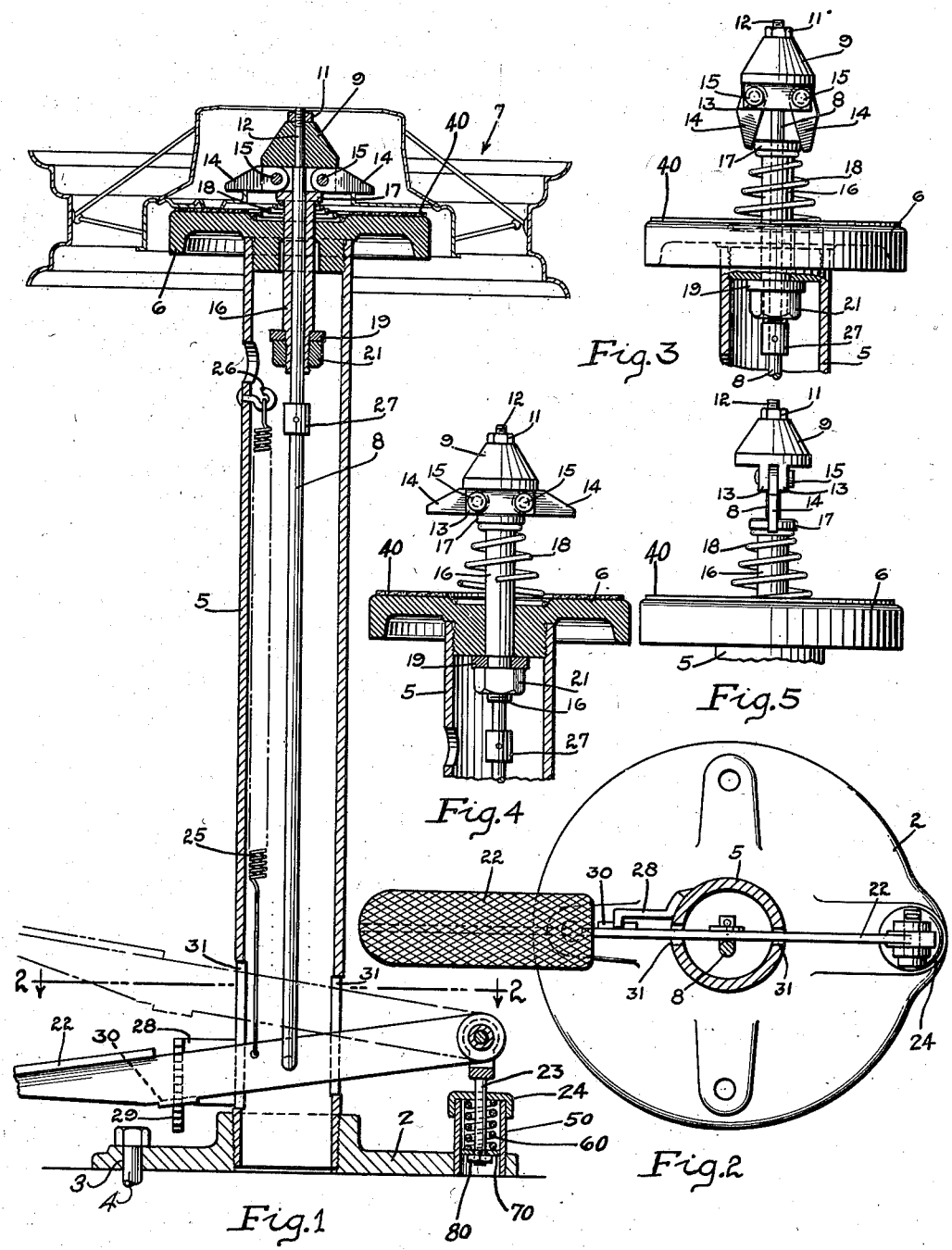

2,081,402

UNITED STATES PATENT OFFICE 2,081,402

TIRE CHANGING STAND

James R. Krema, Faribault, Minn.

Application July 17, 1935, Serial No. 31,874

6 Claims. (Cl. 144—288)

This invention relates to new and useful improvements in apparatus adapted to facilitate the operation of mounting and demounting pneumatic tires, and more specifically to a tire changing stand having means at its upper end adapted to receive and firmly support a wheel, while mounting a tire thereon or removing one therefrom.

An object of the present invention is to provide a tire changing stand of simple and inexpensive construction, which is neat in appearance, is simple to operate, will securely support the wheel in fixed position while work is being performed upon the tire thereof, and which is provided with means whereby the pressure applied to the wheel or other object to be supported on the stand, may be varied to suit the nature of the work.

Other objects of the invention reside in the simple and inexpensive construction of the apparatus whereby it may be manufactured at small cost; in the unique arrangement of the dogs which are so associated with the operating member or foot pedal that when a wheel is positioned upon the stand, and the operating member is operated, the dogs will automatically swing outwardly into operative positions and engage the wheel, after which the operating member may be locked against movement, thereby to securely support the wheel upon the stand; and, in the spring connection between the operating member and the base of the stand which compensates for variations in the thickness of the wheel hub or other work to be supported, and which also makes it possible to secure the work in position upon the stand at different pressures.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view showing the general construction of my improved tire changing stand, and also showing a wheel supported thereon;

Figure 2 is a cross-sectional view on the line 2—2 of Figure 1;

Figure 3 is a detail view of the upper portion of the stand, partially in section, and showing the dogs in their normal inoperative positions;

Figure 4 is a view similar to Figure 3, but showing the rod, upon the upper end of which the dogs are mounted, partially actuated to cause the dogs to swing outwardly into operative positions; and Figure 5 is a side view of Figure 4.

The novel tire changing stand herein disclosed, is shown comprising a suitable base 2, provided with apertures 3, whereby it may be secured to a floor by suitable bolts 4. An upright post 5, preferably tubular in cross-section, has its lower end suitably secured in the base 2 and has a supporting plate 6 secured to its upper end adapted to receive and support a wheel 7, as shown in Figure 1.

To prevent slippage of the work or wheel upon the plate 6, a suitable fabricated material 40, is preferably secured to the supper surface of the plate, as best illustrated in Figure 1. This facing, which may be of such material as brake lining, for example, also acts to protect the finish on the wheel so that it will not become marred or scratched.

An important feature of the invention resides in the novel means provided for securing the wheel in position upon the supporting plate 6. The securing means is shown in its simplest form, in Figures 1, and 3 to 5, inclusive, and comprises a rod 8 having a suitable head 9 secured to the upper end thereof, preferably by means of a nut 11 received in threaded engagement with the upper reduced end portion 12 of the rod 8. By reducing the upper end of the rod 8, as shown at 12 in Figure 1, a shoulder is provided against which the cone-shaped head 9 may be firmly secured by the nut 11.

The head 9 is preferably shaped as shown in Figure 5, whereby it will be noted that it is provided with downwardly extending flanges 13, spaced apart to receive a pair of dogs 14, pivotally supported therebetween by suitable pivot pins 15. A tubular member or sleeve 16 is mounted for limited slidable movement in a central bore provided in the supporting plate 6, and is provided at its upper end with an annular flange 17, against which one end of a suitable spring 18 is seated. The opposite end of this spring is shown seated in a recess provided in the upper face of the supporting plate 6. A suitable washer 19 is shown secured to the lower end of the sleeve 16 by a nut 21, received in threaded engagement with the lower end of the sleeve.

The compression spring 18 is preferably wound in a spiral, as shown in Figures 1 and 3 to 5, whereby the coils thereof may be nested into a comparatively small space, as when the dogs 14 are moved into engagement with the wheel, as shown in Figure 1. The spring 18 constantly urges the sleeve upwardly to the position shown in Figures 3, 4, and 5, whereby the upper flanged end thereof will be positioned between the lower ends of the dogs 14, as best shown in Figure 3.

The rod 8 is provided at its lower end with an operating member or foot pedal 22 having one end shown pivotally connected to a spring-mounted element or plunger 23, slidable in the upper wall 24 of a tubular casing 50 secured to the base 2, as best shown in Figure 1. A suitable spring 60 is coiled about the plunger 23 and has one end seated against the upper wall 24 of the casing and its lower end against a washer 70, supported upon the plunger 23 by a suitable nut 80. The lower end of the rod 8 is suitably connected to the foot pedal 22, and a tension spring 25 has one end connected to the foot pedal 22 and its opposite end to a suitable hook 26 secured to the wall of the upright post 5. Thus, the rod 8 and foot pedal 22 are constantly urged in an upward direction, whereby the dogs 14 will be in the position shown in Figure 3. A suitable stop collar 27 may be provided upon the rod 8 adapted to engage the lower end of the sleeve 16, thereby to limit the upward movement of the rod, it being understood that the washer 19 of the sleeve 16 is normally engaged with the lower face of the hub of the supporting plate 6, as best shown in Figure 3.

Means is provided at the lower end of the stand for securing the foot pedal 22 in operative position as, for example, when a wheel is secured in position upon the supporting plate 6, as shown in Figure 1. Such means is best shown in Figures 1 and 2, and may consist of a ratchet bar 28 secured to the wall of the upright post 5 and having a plurality of ratchet teeth 29 adapted to engage an offset edge 30 of the foot pedal, whereby the dogs may be retained in operative positions in engagement with the wheel, as will be readily understood by reference to Figure 1. It is to be further understood that the slots 31 provided in the lower end of the supporting member 5 and in which the foot pedal 22 is movable, are sufficiently wide to permit the foot pedal to be slightly moved in a lateral direction whereby the foot pedal may readily be disengaged from the ratchet teeth 29.

The spring 60 is preferably of a comparatively heavy wire, and provides means for compensating for variations in the thickness of the wheel hub or other work to be supported upon the stand, so that the foot pedal 22 may always be moved into locking engagement with one of the teeth 29 of the ratchet bar or quadrant 28. The spring 60 also provides means whereby the pressure on the work may be increased, if desired, by simply pressing the foot pedal 22 downwardly to engage a lower notch or tooth in the bar 28. The nut 80 on the lower end of the plunger 23 provides means whereby the swinging end of the pedal 22 may be adjusted with respect to the notches or teeth 29, whereby the pressure applied to the wheel, when the pedal is in locking engagement with a given tooth 29, may be varied, as desired.

The apparatus herein disclosed has been found very practical in operation. It greatly simplifies the operation of securing the wheel in position while changing tires. There are numerous devices of this general character now on the market but, to the best of my knowledge, all of these comprise threaded means for clamping the wheel in position upon the support, and they therefore require considerable time to secure a wheel in position before work can be performed upon its tire.

The operation of securing the wheel in position for changing tires is greatly simplified and expedited by the employment of the novel stand herein disclosed. Because of the dogs normally being retained in their inoperative positions, as shown in Figure 3, the stand is always ready to receive a wheel, and the latter may be quickly secured in position thereon by simply depressing the foot pedal 22. When the necessary work has been performed upon the wheel, the foot pedal is released from the ratchet 29, whereby the wheel is simultaneously released and may then be removed from the stand.

The form shown in Figure 1, comprises very few parts, and is very rugged and substantial in construction, and the connections between the foot pedal and the dogs at the upper end thereof, are all concealed within the tubular post 5. It is also to be noted that it requires very little space, and the operator may work upon the wheel from any side of the stand, as the apparatus is symmetrical about its axis.

I claim as my invention:

1. In an apparatus of the class described, an upright post having a supporting plate at its upper end adapted to support a wheel, a plurality of dogs normally supported in inoperative position, an operating member for the dogs, means yieldably mounted on said plate and positioned to be engaged by the dogs to move them into operative positions, upon initial movement of the operating member, and whereby said dogs will grip and secure the wheel to the supporting plate, on continued movement of the operating member, said yieldably mounted means also providing a guide for the upper end of the operating member.

2. A tire changing stand comprising a suitable base having an upright secured thereto, a supporting plate secured to the upper end of the upright adapted to receive a wheel, a rod mounted for axial movement in the plate, a plurality of dogs pivotally supported on the rod and normally in inoperative positions, a sleeve forming a guide for the upper end of the rod and positioned to be engaged by said dogs and move them into operative positions, upon initial downward movement of the rod, whereby the dogs will engage the wheel and secure it in position upon the supporting plate, upon continued movement of the rod.

3. A tire changing stand comprising an upright post having a supporting plate secured to its upper end adapted to support a wheel, a sleeve slidably supported in said plate, a rod slidable in the sleeve and having a plurality of dogs pivotally mounted in the upper end of the rod and normally in inoperative positions, an operating member for the rod, a spring normally holding the sleeve in an elevated position whereby it is engaged by the dogs, upon initial movement of the operating member, thereby to move the dogs into operative positions to engage the wheel hub and secure it to the plate upon continued movement of the rod, and means for locking the rod in wheel supporting position.

4. A tire changing stand comprising a base having a post secured thereto, a plate secured to the upper end of the post adapted to support a wheel, a sleeve mounted for vertical movement in the plate, means constantly urging said sleeve upwardly, a rod mounted for vertical movement in said sleeve and having a head at its upper end, a plurality of dogs pivotally supported in said head and normally depending therefrom with their lower ends engaging the sleeve, spring means for normally holding the rod in elevated inoperative position, a foot pedal for actuating the rod, and means for locking the pedal in operative position, said sleeve functioning to move said dogs into operative positions, upon initial movement of the rod, and whereby they will engage and secure the wheel to the plate, upon continued movement of the rod.

5. A tire changing stand comprising a base having a tubular post secured thereto, a plate secured to the upper end of the post and adapted to support a wheel, a sleeve mounted in the plate and having an axial bore, means yieldably resisting downward movement of the sleeve, a rod slidable in said bore and having a head at its upper end, a plurality of dogs pivotally supported in the head and normally in retracted positions with their lower ends engaging the upper end of the sleeve, means for normally holding the rod in elevated inoperative position, a foot pedal connected to the lower end of the rod for actuating the same, said sleeve and head being so related that when the rod is initially moved downwardly by the foot pedal, the sleeve will cause the dogs to move outwardly into operative positions, after which the sleeve will move as a unit with the rod and means for locking the pedal in wheel securing position.

6. In a tire changing stand comprising an upright support having a wheel-supporting member secured to the upper end thereof, a sleeve mounted for limited sliding movement in said supporting member, a rod slidably supported in the sleeve and having a head at its upper end, a plurality of dogs pivotally mounted in said head and normally in retracted positions, a spring normally holding the sleeve in an elevated position with its upper end disposed above the plate in a position to be engaged by the dogs when the latter are initially moved downwardly by the rod, whereby the dogs are moved into operative positions to thereby engage and secure the wheel to the supporting member, upon continued movement of the rod, and means for actuating the rod.

JAMES R. KREMA.